United States Patent [19]

Vennemeyer et al.

[11] 4,111,031
[45] Sep. 5, 1978

[54] POWDER METAL CROWN GEAR FORMING PROCESS

[75] Inventors: Alfred C. Vennemeyer, Vandalia; Richard A. Ernst, Dayton, both of Ohio

[73] Assignee: General Motors Corporation, Detroit, Mich.

[21] Appl. No.: 831,938

[22] Filed: Sep. 9, 1977

[51] Int. Cl.² .......................................... B21D 22/00
[52] U.S. Cl. .................................. 72/359; 29/159.2; 72/377
[58] Field of Search .................. 72/359, 377, 470; 29/159.2, DIG. 31, 420

[56] References Cited

U.S. PATENT DOCUMENTS

| | | | |
|---|---|---|---|
| 3,298,219 | 1/1967 | Schober | 72/377 |
| 3,355,930 | 12/1967 | Federov | 72/377 |

Primary Examiner—Leon Gilden
Attorney, Agent, or Firm—George A. Grove

[57] ABSTRACT

An improved method is disclosed for making spur gears having teeth with axially crowned working faces. A sintered powdered metal compact is formed in the shape of the desired gear, but slightly oversized and preferably with gear teeth having working faces that are uncrowned in the direction parallel to axis of rotation of the gear. The compact is forced into a smooth circular die cavity having a diameter slightly less than the outer diameter of the compact. Only the tips of the gear teeth engage the die wall. While the compact is constrained within the die, axial compressing forces are applied to it and gear teeth having axially crowned working faces are produced. At the same time, the gear is finish sized to desired dimensions.

5 Claims, 6 Drawing Figures

POWDER METAL CROWN GEAR FORMING PROCESS

BACKGROUND OF THE INVENTION

This invention relates to a practical method of cold forming axially crowned working surfaces on the teeth of spur gears or the like starting with a sintered powder metal compact in the general shape of the desired gear, but slightly oversize. More particularly, this invention relates to a method of forming gear teeth having axially crowned working faces and at the same time sizing the gear to desired dimensions by upsetting a sintered powder metal gear compact.

Gear teeth having axially crowned working faces are well-known. Axially crowned gear teeth differ from normal gear teeth in that each tooth is thinner at the ends than at the center of the gear face. In other words, the gear working faces are convexly curved so that the gear tooth appears to bulge out at the center of the gear. Thus, when axially crowned spur gears interact, the working faces contact at the bulged center portion and not at the ends of the gear teeth. The principal advantages of axially crowning is that the gear develops a better wear pattern and theoretically is able to accept a greater load. An auxiliary advantage is that crowned gears operate at reduced noise levels. These benefits are obtained from even slight crowning. Working faces convexly curved as little as 0.0003 inch per inch of face width are generally sufficient for most applications.

Until now crown gears have been produced by machining operations such as hobbing and shaving. The principal disadvantage of machining gears is that such operations are complicated, slow and expensive.

It is therefore an object of this invention to provide a method of forming spur gears having teeth with axially crowned working faces that does not require machining to shape the tooth profile. It is also an object of this invention to provide equipment by which such gears may be formed faster and cheaper than by machining.

More specifically, it is an object of this invention to produce by a cold forming process axially crowned spur gear teeth from oversized sintered powder metal gear shaped compacts having gear teeth that are not crowned in the axial direction.

It is a further object of this invention to provide a method for forming crowned gear teeth and at the same time finish sizing the gear to desired dimensions by a restrike operation performed on sintered powder metal gear compacts.

BRIEF SUMMARY OF THE INVENTION

In a preferred embodiment, these and other objects are accomplished by first forming a sintered powder metal compact in the shape of a desired spur gear wheel or the like. Conventional powder metallurgy techniques may be employed. The compact is slightly oversized with respect to the final dimensions of the desired gear in that the width or thickness of the compact and the outside or gear tooth tip diameter are somewhat larger. The gear teeth may be involute or crowned in the radial directions, i.e., between their root portions and their tips. However, since the compacts will have typically been formed in a one piece die that shapes the teeth and the gear wheel, the faces of the gear teeth will not be crowned in the axial direction.

A radial compression force is then applied to the tips of the gear teeth and at approximately the same time axial forces are applied evenly across the side faces or opposite ends of the gear. The compression forces are applied in such a manner that the working faces of the gear teeth are not restricted. These forces cause the metal within the compact to flow and results in the gear teeth assuming an axially crowned profile. At the same time, the gear is further densified and strengthened.

In a preferred embodiment, the compressing forces are applied by a restrike operation in a suitable die. The sintered powder metal spur gear compact is located between two opposite coacting punches such that the punches engage the opposite ends of the compact. The punches operate to apply an axial force to the compact and at the same time force the compact into a die having a simple smooth circular cavity defining surface. The inner diameter of the die is slightly less than the outer diameter of the compact. The compact enters the die by way of a beveled entrance so that no metal shavings are produced. Thus, forcing the gear into the die reduces the diameter of the gear and also applies a radial force to the gear tips. The punches apply axial upsetting forces that reduce the thickness of the gear wheel. The combination of these forces deforms the gear teeth such that a bulge or crown is formed on each gear tooth face in the axial direction, i.e., from one side of the spur wheel to the other.

Conventional powder metallurgy compacting and sintering processes typically produce compacts having higher density near the surfaces receiving the compaction force and lower density near the center of the compact. Such low density areas then experience greater metal flow when subjected to a subsequent compression force. In a preferred embodiment, gears formed by conventional powder technology have a lower density near the center of the gear teeth faces. Thus, the flow of metal during compression is greater at the center of the gear tooth faces than at the ends. Since the gear teeth faces are unrestricted and unsupported by the die in the practice of our invention, the gear teeth are deformed by the compression forces into the desired crowned profile. Although applicants believe some crowning might be produced by their method on compacts having approximately uniform density, the presence of a center zone having significantly lower density than the ends of the gear results in a more substantial crown on gear teeth formed by this invention.

By this invention the crown tooth profile is formed in the same restrike operation that decreases the outer diameter of the gear and the length of the gear. Thus, the force of the punches and the diameter of the die cavity are easily adjusted so that the gear is finish sized in the same operation. It has also been found that greater sizing precision is obtained by providing the compact with a central axial bore and inserting a mandrel through the bore between the punches during compressing. The bore is initially about the same size or very slightly smaller than the diameter of the mandrel. The mandrel prevents radial displacement of the compact during processing and thereby assures that the gear teeth tips will be concentric with the axis of the gear. Further, the diameter of the mandrel is adjusted to equal the desired finish diameter of the bore.

It will be appreciated that the gear is further densified and strengthened by the upsetting operation that forms the axially crowned gear teeth and precision sizes the gear. The gears thus produced require no further processing before being used. The ability to accomplish all of these tasks in a single cold forming operation makes it possible to produce finished gears having axially crowned gear teeth at considerably less expense and at a much faster rate than prior art machining techniques.

BRIEF DESCRIPTION OF THE DRAWINGS

The present invention will be further illustrated with reference to the accompanying drawings wherein.

DETAILED DESCRIPTION OF THE PREFERRED EMBODIMENT

Figure 1:
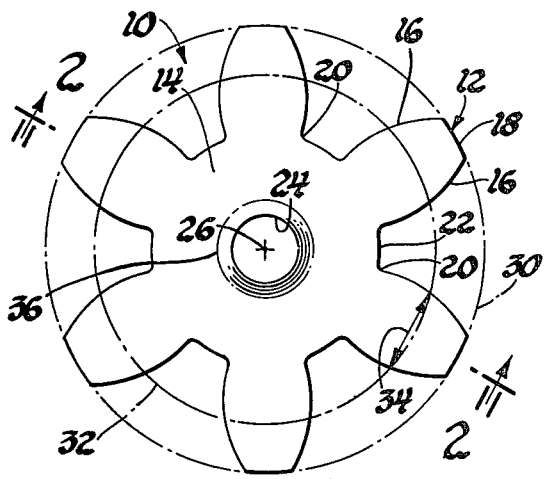
FIG. 1 is a plan view of a sintered powder metal spur gear compact to be processed in accordance with this invention.
Figure 2:
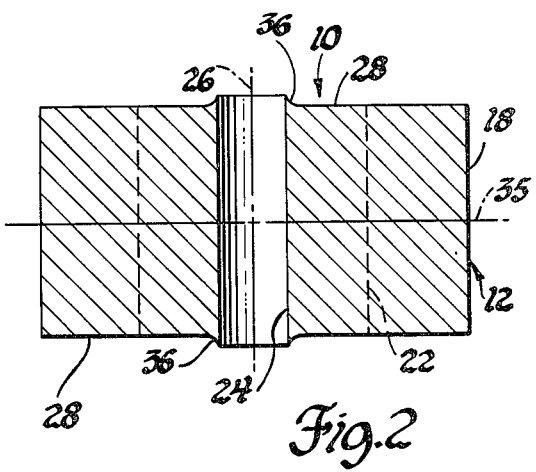
FIG. 2 is a cross-sectional view of the spur gear compact shown in FIG. 1 taken along line 2—2 and looking in the direction of the arrows.
Figure 3:
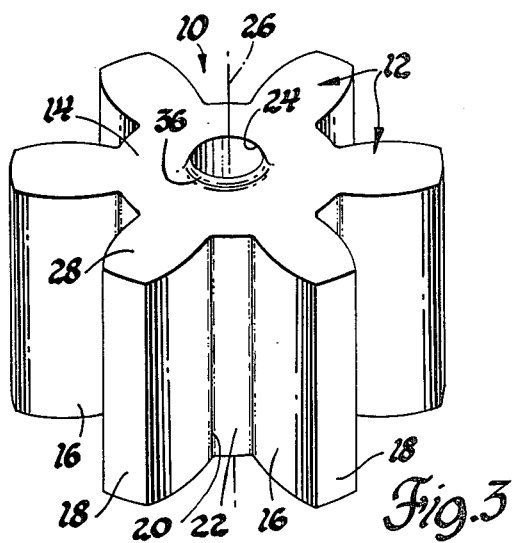
FIG. 3 is a perspective view of the gear compact illustrated in FIG. 1.

In a preferred exemplary embodiment, spur gears for use in a conventional automobile oil pump were axially crowned and sized by this invention. Referring now to FIGS. 1, 2 and 3, a powder metal compact 10 is initially formed in the general shape of a spur gear. The preformed compact 10 comprises a series of involute gear teeth 12 extending radially from a cylindrical gear body 14. The involute teeth 12 have working faces 16 and tips 18. The gear root 20 is generally defined as the point where teeth working faces 16 intersect the exterior surface 22 of the gear body 14. Compact 10 is provided with a central bore 24 concentric with the intended axis of rotation 26 of the gear and extending between the gear ends 28. Thus, it can be seen that the usual gear features are preformed in compact 10. However, the outer diameter of the compact, as measured by gear tooth tip circle 30, and the thickness of the compact between ends 28 are slightly greater than the corresponding dimensions of the finished gear.

Compact 10 is initially formed from commercially available metal powder, preferably an iron powder containing 0.4 to 0.6% carbon. Approximately 129 grams of powder are placed in a die defining the desired end profile and size of compact 10 as illustrated in FIG. 1. A conventional double action pressing operation briquettes the powder by applying an axial force of about 60 tons evenly across gear ends 28. Double action compaction is known to produce compacts having higher metal densities near ends 28 and lower density near the center plane 35. This density gradient appears to be a significant factor in determining the amount of crowning formed during the restrike operation. Compact 10 is ejected from the die having formed gear teeth 12 (but not axially crowned) and a central axial bore 24. Also, flange 36 encircling bore 24 is formed on gear ends 28 to provide additional metal to the bore surface during the restrike operation in order to make the bore surface denser and stronger.

After compact 10 is briquetted, it is sintered in a nonoxidizing atmosphere at a temperature of about 1600° F. The sintered compact 10 is then coated with a mist spray of suitable lubricating oil. Bore 24 is then burnished to size its inner diameter to approximately the desired finish dimensions. In the preferred embodiment, the burnished bore diameter of the compact is 0.476 inch which is slightly smaller than the bore of the desired finished gear.

Figure 4:
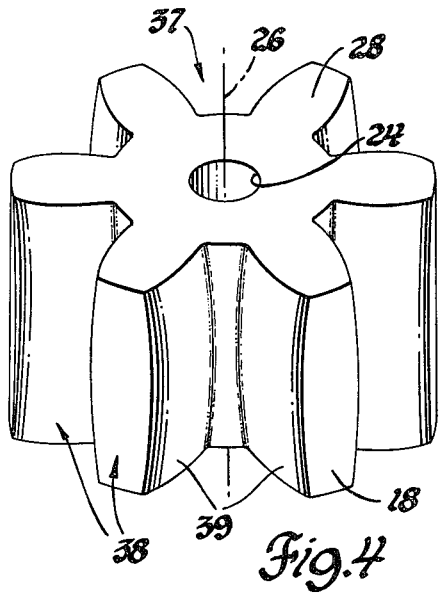
FIG. 4 is a perspective view of a finished spur gear having a crowned tooth profile and formed from the compact illustrated in FIG. 1 by the method of this invention.

After sintering, lubricating and burnishing, compact 10 is finished by a restrike operation in a suitable die that produces gear 37 as seen in FIG. 4. During restriking, compact 10 is subjected to compression forces applied to gear tips 18 and ends 28 in such a fashion that working faces 16 are not supported or restricted by the die. As seen in FIG. 4, compact gear faces 16 become convexly curved (crowned) working faces 39 and axially crowned gear teeth 38 are formed.

Figure 5:
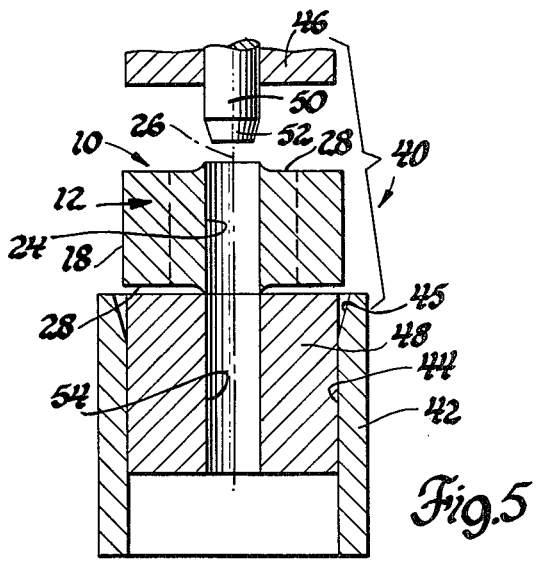
FIG. 5 is a sectional view of a die and punch assembly employed to produce crowned gears by this invention.

FIG. 5 indicates the die and punch assembly 40 used in forming the axially crowned gear teeth 38 from gear teeth 12 of compact 10. Die 42 is manufactured preferably of tungsten carbide or other similar wear-resistant material. The inner surface 44 of die 42 has a smooth circular shape and a diameter slightly less than the outer diameter of compact 10. Die 42 is provided with a beveled entrance 45 to guide compact 10 into the die. Forcing the compact into die 42 accurately reduces the outer diameter of the compact to the diameter of the finished gear and at the same time supplies radial compressing forces to the compact gear tips 18.

Axial compressing forces are applied to compact 10 by two coacting punches 46 and 48. Upper punch 46 is provided with a floating centrally located mandrel 50 having a tapered locator 52. The diameter of mandrel 50 is approximately equal to the desired finish diameter of gear bore 24. An appropriate cavity 54 for mandrel 50 is provided in lower punch 48.

Die assembly 40 is depicted in FIG. 5 at the beginning of a downward restrike stroke. Compact 10 is positioned as illustrated between punches 46 and 48 near die entrance 44. As upper punch 46 begins its downward motion, mandrel 50 passes through bore 24 of compact 10 and enters receptacle 54. Mandrel 50 centrally positions compact 10 with the aid of tapered locator 52 and is snuggly fitted into receptacle 54 to prevent radial displacement of the compact during the restrike operation. It has been found that the use of mandrel 50 essentially eliminates eccentricity in the finished gear 37. Although with accurate tooling, the diameter of mandrel 50 might equal the burnished bore diameter so that mandrel 50 may just slip through bore 24, it is preferred to have the mandrel diameter slightly larger than that of burnished bore 24. Thus, as mandrel 50 is forced through bore 24, the bore is sized by the mandrel to the desired finish dimension. The slightly larger mandrel diameter is preferred because the force of the mandrel helps to densify and strengthen the surface of bore 24 and because better precision is possible by mandrel sizing than by conventional burnishing tools.

Figure 6:
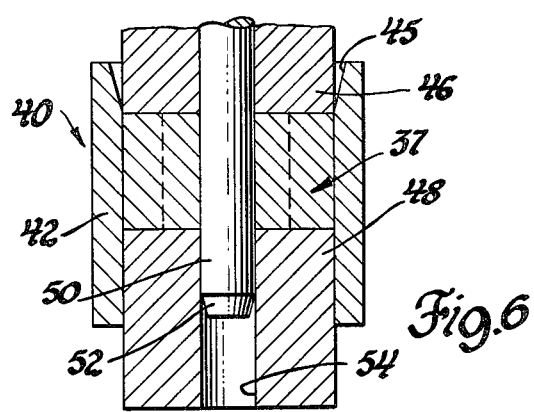
FIG. 6 is a sectional view of the die assembly of FIG. 5 engaged in forming a gear by this invention.

After compact 10 is positioned by mandrel 50, upper punch 46 and lower punch 48 engage compact ends 28 and begin to apply an axial force of about 60 tons to the compact 10. Punches 46 and 48 move simultaneously downward with compact 10 pressed between them. Beveled die entrance 45 guides the compact 10 and punch 46 into die 42. The bevel angle and the oversize of the compact 10 are exaggerated in FIG. 5 for purposes of illustration. The diameter of the opening of entrance 45 is larger than the outer diameter of compact 10 so that no metal shavings are produced during the restrike. Die 42 and entrance 45 are circular in any cross-section perpendicular to axis of movement of punches 46 and 48. Thus, the die 42 engages only the tips 18 of the compact 10 and provides no restraint or support for other parts of the compact 10 such as gear tooth faces 16. Die entrance 45 applies a radial compressing force to the gear tips 18 and thereby reduces the outer diameter of compact 10. Compact 10 enters round die 42 and is sized therein to the desired outer diameter. In FIG. 6, the die assembly 40 is illustrated during its downward stroke. Finished gear 37 can be seen constrained within die 42 and pressed between punches 46 and 48.

After finished gear 37 has been formed from compact 10, punches 46 and 48 move simultaneously upward until gear 37 is ejected from die 42. Punch 46 continues its upward motion and mandrel 50 is withdrawn from finished bore 24. Gear 37 is then removed from the die.

In the discussion of gears, it is common to refer to certain dimensions as being most relevant. As illustrated in FIG. 1, the diameter of circle 30 defined by gear tips 18 and concentric with axis 26 is generally referred to as the outer diameter of the gear. The pitch circle 32 represents the effective size of a gear when engaging another similar gear. The distance between the points where the working faces 16 intersect the pitch circle 32 is the gear chordal thickness 34 (chordal because the dimension is of a chord of the circle rather than an arc). The distance between ends 28 is referred to as the gear width or, where appropriate, the face width (FIG. 2). Center plane 35 is equidistant between ends 28.

The effect of axial crowning can be better understood by reference to the changes in the gear chordal thickness 34. As mentioned above, the chordal thickness 34 of compact 10 is equal whether measured at gear ends 28 or center 35. In this embodiment, thickness 34 is 0.2601 inch after briquetting and sintering. As can be seen in the Figures, working faces 16 are obviously curved in the radial direction in order to form the involute shape of gear teeth 12. This involute shaping is sometimes referred to as radial crowning. However, for a single gear tooth 12, two axially oriented lines along opposite working faces 16 are straight and parallel. Therefore, working faces 16 of compact 10 are referred to as being axially parallel.

During the restrike operation, axial parallel working faces 16 of compact gear teeth 12 are deformed into axially convexly curved working faces 39 of finished gear teeth 38, as seen in FIG. 4. The amount of actual crowning can be understood in terms of the change in the thickness 34 of an exemplary oil pump gear. After restriking, the gear is 0.2612 inch thick near the ends or faces 28 of the gear 37 but 0.2629 inch thick near the center, a difference of 0.0017 inch. Similar slight axial bulging of the gear teeth 38 is also observed near the root, the tip, and other intermediate points along working faces 39. In the manufacture of oil pump gears it is not desired to have too large a crown because the gaps created near the ends of the gear teeth tend to increase oil leakage. However, the amount of actual crowning does not need to be large to experience the benefits associated with such gears. In tests conducted to compare oil pump gears formed by the restrike operation of this invention with similar gears having axially parallel working faces formed by machining, it was observed that the axially crowned gear teeth developed a substantially better wear pattern located about the center of the gear. The wear patterns for axially parallel gears frequently developed near the ends of the gear. In this regard, it is noted that the amount of crowning depicted in FIG. 4 is exaggerated for the purpose of illustration and the parts are otherwise not necessarily drawn to scale. In applications other than oil pumps, it may be desirable to produce a greater amount of axial crowning. However, in general it is not necessary to vary the gear thickness by more than 0.0003 inch to obtain the superior performance of axially crowned gears.

At the same time that the axially crowned gears 37 are formed, compact 10 undergoes other significant dimensional changes. The outer diameter is reduced from 1.542 inches to 1.530 inches. The gear width is simultaneously reduced from 1.513 inches to 1.500 inches, and flanges 36 are eliminated to produce planar gear ends. The bore diameter is increased from 0.476 inch to 0.482 inch. Because of the precision possible by the restriking operation, these dimensions can be carefully maintained so that the gears produced by our forming method require no further sizing operations. Further, the restriking also increases the overall metal density from 0.21433 pound per cubic inch for the compact to 0.21619 pound per cubic inch for the finished gear. Densifying the metal acts also to strengthen the gear.

One skilled in the art would readily observe that this invention can be utilized to axially crown spur gears for a wide variety of applications. Although in the preferred embodiment the gear teeth have axially oriented working faces, it is believed that the presence of a density gradient within the powder metal compact plays an important role in the crowning operations and that the restrike operation of this invention can be employed to provide crowning on other types of gears. It is also apparent that the invention can be adapted to provide axially crowned working faces to internal gears as well as to external gears.

Although this invention is described in terms of certain embodiments thereof, it will be appreciated that other forms thereof could readily be adapted by one skilled in the art. Accordingly, the scope of our invention is intended to be considered limited only by the following claims.

We claim:

1. A method of forming a spur gear having gear teeth with axially crowned working faces from a sintered powder metal compact comprising a cylindrical gear body and gear teeth extending radially from said body, said method comprising applying radially compressing force to the compact gear teeth tips without restricting the compact gear teeth working faces from deformation by pressing the compact into a die having a smooth circular cavity said compressing force thereby reducing the outer diameter of the gear, and applying an axial compaction force to said compact while constrained in said die such that the axial width of the compact is reduced and said axially crowned gear teeth faces are formed.

2. A method of forming a spur gear having gear teeth with axially crowned working faces and simultaneously finish sizing said gear from a sintered powder metal compact comprising a cylindrical gear body, a central axial bore and gear teeth extending radially from said body and having axially parallel working faces, said method comprising inserting a mandrel of a predetermined diameter through said axial bore to size said bore to a desired finish dimension, radially compressing the compact gear teeth tips without restricting the compact gear teeth faces by forcing said compact into a die having a beveled entrance and a smooth circular cavity, the diameter of said cavity being slightly less than the outer diameter of the compact, said radial compressing being operative to reduce said outer diameter to a desired finish dimension, and axially compressing said compact while constrained within said die, said compression thereby reducing the gear axial width to the desired dimension and forming said axially crowned working faces on said gear teeth.

3. A method of forming gear teeth having axially crowned working faces comprising, forming a sintered powder metal compact having a circular gear body and radial gear teeth, radially compressing said compact by applying a force to the gear teeth tip without restricting the compact gear teeth working faces from deformation, and axially compressing the compact by applying a force to end surfaces of said compact, said forces being operative to deform said gear teeth and their working faces into axially crowned surfaces of desired configuration.

4. A method of forming a circular gear having gear teeth with axially crowned working faces from a sintered powder metal compact having a circular gear body, a central axial bore and radially extending gear teeth, said method comprising subjecting said compact to compressing forces applied between the bore surface and the gear teeth tips to reduce the outer diameter of the compact and to size the bore if desired, and applying a compressing force to the end surfaces of said compact to reduce the axial width of the compact, the combination of said compressing forces operating to deform said gear teeth and their working faces into axially crowned surfaces of desired configuration.

5. The method of forming a circular gear having gear teeth with axially crowned working faces from a sintered powder metal compact comprising a circular gear body and radially extending gear teeth having axially parallel working faces, said method comprising applying a radial compressing force to the tips of the compact gear teeth without restricting the compact gear teeth working faces from deformation, said radial compressing thereby decreasing the outer diameter of said compact, and substantially concurrently applying an axial compressing force to end surfaces of said compact and thereby reducing the axial width of said compact, said radial and axial compressing being operative to densify said gear and to deform said gear teeth and their working faces into axially crowned surfaces of desired configuration.

* * * * *